United States Patent Office 3,280,167
Patented Oct. 18, 1966

3,280,167
PROCESS FOR THE PRODUCTION OF ALIPHATIC NITRILES FROM OLEFINS USING SOLID ACID REACTING BORON PHOSPHATE OR TITANIUM PHOSPHATE CATALYSTS
Klaus Schwarzer and Arnold Hausweiler, Cologne-Flittard, and Rudolf Stroh, Opladen, and Bernhard Scherhag, Leverkusen, Germany, assignors to Farbenfabriken Bayer Aktiengesellschaft, Leverkusen, Germany, a German corporation
No Drawing. Filed Oct. 8, 1964, Ser. No. 402,616
Claims priority, application Germany, July 18, 1959, F 28,979; Oct. 23, 1959, 29,687; Nov. 28, 1959, 29,956; Dec. 9, 1959, 30,043; Dec. 12, 1959, 30,072; Dec. 24, 1959, 30,177; May 5, 1960, 31,164
8 Claims. (Cl. 260—465.3)

This application is a continuation-in-part of application Serial No. 42,945, filed July 14, 1960, now abandoned.

It is known that acrylonitrile can be obtained by reaction of propylene with ammonia and molecular oxygen, at elevated temperature in the gas phase over catalysts (see U.S. Patent No. 2,481,826). In U.S. Patent No. 2,904,580, bismuth phosphomolybdate is referred to as a particularly effective catalyst. The catalst in that case is advantageously employed on a support and, according to the information given in that specification, the best results are produced when silica gel is used as support. Furthermore, tin and antimony salts of phosphomolybdic acid and molybdic acid and bismuth molybdate and bismuth phosphotungstate are stated also to be suitable as catalysts.

If a high propylene conversion and thus a high yield of acrylonitrile with a single passage of the gas mixture is to be achieved with these catalysts, then in accordance with the data given in the Examples of the said U.S. Patent No. 2,904,580 the proportion of the support material in the prepared catalyst should comprise only about 30% by weight and contact times of about 7 to 8 seconds are necessary. The high proportion of catalytically active substance is a disadvantage restricting the industrial utilization of the process in view of the comparatively high cost of bismuth and molybdenum compounds.

It has now been found that, in the conversion of propylene or isobutylene with ammonia and molecular oxygen in the presence of catalysts in the gas phase at elevated temperature into aliphatic nitriles, especially acrylonitrile and methacrylonitrile, catalysts consisting of so-called solid phosphoric acids from the group of boron phosphate and titanium phosphate which have been activated by addition of compounds of iron, cobalt, copper, bismuth, aluminum, molybdenum, or tungsten, or of mixtures of these compounds as anions and whereby the cation is a phosphate, phosphomolybdate or phosphotungstenate.

By solid phosphoric acids are to be understood in this case mixtures or compounds of phosphoric acids with an adsorption material or substance in which the phosphoric acids are bound either physically or chemically in stoichiometric proportions or bound partially by physical and partially by chemical influences or forces which exist as methanically strong and hard coherent solids or compositions under the reaction conditions. A characteristic feature of all these solid phosphoric acids is their pronounced acidity, which can be shown by the changes in color produced by the colorimetric indicators for pH determinations p-dimethylaminoazobenzene (methyl yellow) and phenylazodiphenylamine, from yellow to red and from yellow to violet, respectively, corresponding to $pK_a$ values of $<3.29$ and $<1.52$, respectively (method of C. Walling, Journal of the American Chemical Society, vol. 72 (1950), page 1164; see also F. Asinger, Chemie und Technologie der Monolefine, pages 368–369 (Akademie-Verlag, Berlin, 1957), and by K. Wimmer, in Houben-Weyl, Methoden der organischen Chemie, vol. 4/II, fourth edition (1955), pages 206–207).

The production of the solid phosphoric acids is generally known and has long been carried out. It is usually effected by, for example, a phosphoric acid of highest possible concentration being mixed or kneaded with a dry and pulverulent adsorbent or reagent, it being possible for additives to be mixed with the dry powder or dissolved in the phosphoric acid, so that liquid to viscous and pasty coherent bodies are formed, which are thereafter subjected to a heat treatment, with or without the use of pressure and in the form of pills or granules or even in unshaped form, whereby they are solidified and form hard compositions.

As solid adsorbent or reagent, it is, for example, possible to use the oxides of titanium and boron and boric acid.

The phosphoric acids being used should preferably be those in which the phosphorus is pentavalent. The acids should be added in such quantities that the final product contains 30 to 75% of phosphoric acid, calculated as $P_2O_5$.

The heat treatment of the initial catalyst composition, which is viscously plastic to liquid and is formed into a paste or shaped bodies, may be effected at temperatures between, for example, 80 and 600° C. and is usually carried out in two steps, the forming or shaping being effected by a partial or complete reaction with the solid adsorbent or reagent, which reaction is usually a distinctly exothermic reaction, at a relatively low temperature in the range from, for example, 80 to 300° C., while an annealing takes place in a subsequent and perhaps longer period as a function of time, at temperatures up to, for example, 600° C., and this heat treatment imparts the necessary mechanical strength to the catalyst. The choice of the best possible temperatures and times for the shaping operation depends on the individual compositions of the adsorption or reaction components and the corresponding phosphoric acids and differs from case to case but can easily be determined. This method of producing solid phosphoric acid catalysts, which is known per se and is in general use, is also employed in the production of the catalysts described herein that are used in the process of the present invention. Accordingly, these catalysts are prepared, for example, either by adding the activators to the other components during the production of the solid catalyst or by impregnating the preformed solid catalysts before they are annealed or fused with the activators or mixtures of activating compounds and subsequently annealing the thus impregnating solid catalyst.

The quantitative ratio between the solid phosphoric acids and the compounds used as activators is preferably 1 to 10% by weight of the compounds added as activators in addition to the solid phosphoric acids. The activators can, for example, be added in the form of hydroxides, oxides or in the form of other compounds, for example, as compounds of phosphoboric or the other components of the solid phosphoric acids. Mixtures of the compounds which are used as activators may also be used in the preparation of catalysts for use in the process of the invention, the activators which have proved especially suitable are inter alia those containing copper, bismuth, aluminum, molybdenum or tungsten as one component and one or more of the other compounds which are specified herein for use as activators.

When the catalysts according to the invention are used in the reaction of propylene or isobutylene with ammonia and molecular oxygen in the gas phase at elevated temperature, equal or better yields of acrylonitrile or methacrylonitrile, related to reacted propylene or isobutylene, are produced than with the catalysts referred to in U.S. Patent No. 2,904,580. The catalysts used in accordance with the invention have however the additional advantage that they are effective at substantially shorter contact periods, so that the yield per unit of volume and time is considerably higher and the catalyst consumption is correspondingly smaller. Particularly good results are produced with catalysts containing boron phosphate.

The reaction of propylene or isobutylene with ammonia and molecular oxygen in the presence of the catalysts of the present invention can be carried out in a fluid or fluidized bed or with catalysts fixedly arranged in a catalytic furnace. Sometimes the catalysts only reach their maximum activity after a prior induction period.

The oxygen required for the reaction of propylene or isobutylene with ammonia to form acrylonitrile and methacrylonitrile, respectively, can be supplied in a relatively pure state or in the form of air. The molar ratio between oxygen and propylene or isobutylene can vary within wide limits and is inter alia dependent on the explosive limits existing under the specific conditions of the experiment. In general, good results are produced with a molar ratio of oxygen to olefin of between 0.5:1 and 5:1, and preferably between 1:1 and 2.5:1.

The propylene or isobutylene can be used in pure form or admixed with saturated gaseous hydrocarbons. The molar ratio between ammonia to olefin can be between 0.05:1 and 3:1, and preferably between 0.1:1 to 1:1. The unreacted olefin can be returned to the process after separation from the reaction products.

It is advantageous for the mixture of olefin, ammonia and oxygen or air to be diluted with steam before entering the reaction zone. The ratio between steam and olefin is preferably so chosen that 0.5 to 10 mols of steam are used to each mol of olefin, but other mixing ratios between propylene or isobutylene and steam are also possible.

The reaction temperature for the conversion of propylene or isobutylene with ammonia and molecular oxygen is generally between 300 and 700° C., advantageously between 400 and 600° C. Apparent contact times of 0.1 to 4 seconds are generally sufficient, but longer contact times are also possible. The apparent contact time is defined here as the time during which one unit by volume of the gas mixture, measured under the pressure and temperature conditions of the catalyst bed, is in contact with one unit by volume of the catalyst bed.

The reaction is generally carried out at normal pressure, but the use of higher or lower pressures is also possible.

In the following examples, unless otherwise indicated, quantities specified as parts are to be understood to be parts by weight and the temperatures as centigrade degrees.

Example 1

500 parts tablets of boron phosphate is impregnated with a solution of 50 parts of $Cu(NO_3)_2 \cdot 3H_2O$ in 125 parts of water, dried at 110° and heated for 10 hours at 450°. The thus prepared catalyst contains 94.7% of boron phosphate and 5.3% of copper phosphate. Using a tubular furnace, 250 standard liters of a mixture preheated to 400° and having the following composition:

6.5% by volume of propylene
4.7% by volume of ammonia
32.5% by volume of air
56.3% by volume of steam are conducted over this catalyst per hour.

The following table indicates the yields and conversions which are obtained:

Reaction temperature, ° C. _____ 530
Propylene conversion, percent _____ 53.0

Yields in percent of the propylene conversion:
  Acrylonitrile _____ 63.5
  Acetonitrile _____ 23.4

In a second experiment there was used instead of the aforementioned composition of the gas mixture a gas mixture of the following composition:

7.4% by volume of propylene
7.4% by volume of ammonia
55.5% by volume of air
29.7% by volume of steam This gas mixture was conducted over the catalyst under the same conditions as mentioned above with the only difference that a reaction temperature of 520° was used. Thereby a propylene conversion of 64% and a yield of acrylonitrile, based on converted propylene, of 43.2% were obtained.

Example 2

(a) 350 parts of boric acid and 700 parts of 85% phosphoric acid are stirred with a solution of 20 parts of aluminum acetate in aqueous nitric acid, 18 parts of copper nitrate and 9 parts of ammonium molybdate. The initially thinly liquid mass is left standing for several hours, is then dried at 150° and heated for 4 hours at 450°. The thus prepared catalyst contains 95.4% of boron phosphate, 2.1% of aluminum phosphate, 1.2% of copper phosphomolybdate and 1.3% of copper phosphate.

320 standard liters of a gas mixture with the composition 7.0% by volume of propylene
5.6% by volume of ammonia
52.4% by volume of air
35.0% by volume of steam are conducted per hour through a furnace over 0.3 liter of this catalyst having a grain size of 450–700 microns distributed in the form of a fluidized bed.

The temperature in the reaction chamber is 520–540°. 80% of the propylene introduced is reacted. Related to the reacted propylene, 66% of acrylonitrile is formed.

(b) If the reaction is carried out under pressure of up to 3 atmospheres then there can be obtained propylene conversions of more than 90%.

For a comparison with the process described in U.S. Patent No. 2,904,580 there was made the following experiment:

Instead of the aforementioned catalyst there was used the catalyst described in U.S. Patent No. 2,904,580, column 4, Example 1 that catalyst having a grain size of 250–700 microns. Under exactly the same conditions as described above under 2(a) a propylene conversion of 50.6% was obtained. The yield of acrylonitrile, based on converted propylene, was 49.2%.

Example 3

3.16 parts of 85% orthophosphoric acid are heated under reflux with 54.4 parts of molybdic acid (85% $MoO_3$) in 600 parts of water for about 16 hours until a solution has formed. 90 parts of concentrated nitric acid and 117.6 parts of $Bi(NO_3)_3 \cdot 5H_2O$ are then added and this solution is used for impregnating 2000 parts of boron phosphate. The mass is dried at 120° and heated for 16 hours at 550°. The prepared catalyst (catalyst 1) contains 95% of boron phosphate and 5% of bismuth phosphomolybdate.

This catalyst was compared with the following catalyst:

(a) A catalyst prepared in the same way and consisting of 95% of silica gel and 5% of bismuth phosphomolybdate (catalyst 2), (b) With a catalyst prepared in accordance with the data of Example 1 of U.S. Patent No. 2,904,580 and consisting of 30% of silica gel and 70% of bismuth phosphomolybdate (catalyst 3), (c) With a catalyst prepared in an analogous manner as the aforementioned catalyst 3 with the only difference that the final catalyst consisted of 90% of silica gel and 10% of bismuth phosphomolybdate (catalyst 4).

All catalysts have a grain size in the range between 150 and 400 microns in diameter and each was disposed in a furnace in which the catalysts were distributed as a fluid bed of the same size and construction. The reaction gas consisted of a mixture of 1 mol of propylene, 0.6 mol of ammonia, 7.5 mols of air and 6 mols of steam. The temperature in the reaction chamber was 520° for catalysts 1 and 2.

As regards catalyst 3 in the experiment α, the optimum reaction temperature of 455° was chosen, this being in accordance with the data given in U.S. Patent No. 2,904,-580 for this catalyst while in the experiment β 520° were used. The results produced with the different catalysts are set out in the following table:

|  | Catalyst 1 | Catalyst 2 | Catalyst 3 | | Catalyst 4 |
|---|---|---|---|---|---|
|  |  |  | α | β |  |
| Contact period in seconds | 0.8 | 0.8 | 6.5 | 0.8 | 0.8 | 6.5 | 0.8 |
| Temperature, degrees | 520 | 520 | 520 | 455 | 520 | 455 | 520 |
| Propylene conversion, percent | 59.2 | 6.6 | 25.9 | 29.2 | 49.7 | 66.5 | 22.6 |
| Yields, related to converted propylene, percent: |  |  |  |  |  |  |  |
| (a) Acrylonitrile | 39.4 | 2.5 | 3.8 | 17.2 | 23.7 | 39.8 | 7.9 |
| (b) Acetonitrile | 3.8 | 0.06 | 0.09 | 3.9 | -------- | 5.7 | -------- |

Catalyst 1 that was prepared as described herein for use in the process of this invention produces a high propylene conversion and a good yield of acrylonitrile after an aparent contact period of only 0.8 second. Comparable results are not produced with catalyst 2 while such results are only obtained at catalyst 3 with an apparent contact period of 6.5 seconds. The catalyst prepared as described for use in the process of this invention thus produces a substantially higher yield per unit of volume and time than the catalyst disclosed in U.S. Patent No. 2,904,580. Comparison with catalyst 2 clearly shows the the advantage of the solid phosphoric acids over an inert supporting material.

*Example 4*

68 parts of molybdic acid are heated under reflux for about 16 hours with 2.33 parts of 85% orthophosphoric acid in 100 parts of water. 10 parts of concentrated nitric acid and 147 parts of $Bi(NO_3)_3 \cdot 5H_2O$ are then added and completely dissolved while heating. This solution is mixed with 1000 parts of titanium dioxide and 2000 parts of industrial polyphosphoric acid. The mass is solidified in 6 hours at 180°, brought to a grain size of 150–400 microns and annealed for 16 hours at 550°. The thus prepared catalyst contains 93.9% of titanium phosphate and 6.1% of bismuth phosphomolybdate.

55% of the propylene used is converted over this catalyst under the same reaction conditions as described in Example 3 at 520° and an apparent contact period of 1.0 second. Based on the converted propylene 66% of acrylonitrile and 5% of acetonitrile are obtained.

*Example 5*

(a) 1000 parts of boron phosphate is impregnated with 500 parts of water containing 11.5 parts of ammonium molybdate and a heavy metal salt. As metal salt, there are used:

Catalyst 1: 100 parts of $Fe(NO_3)_3 \cdot 9H_2O$
Catalyst 2: 73 parts of $Co(NO_3)_2 \cdot 6H_2O$ The thus prepared catalyst 1 contains 95.5% of boron phosphate, 3.65% of ferrous phosphate and 0.85% of ferrous phosphomolybdate and catalyst 2 contains 96.2% of boron phosphate, 3.0% of cobalt phosphate and 0.8% of cobalt phosphomolybdate.

The catalyst mass is dried for 6 hours at 150°, brought to a grain size of 150–450 microns and annealed for 4 hours at 500°. A gas mixture preheated to 400° and consisting of 75 parts by volume of air, 10 parts by volume of propylene, 6 parts by volume of ammonia and 60 parts by volume of steam is then passed in a fluidized bed furnace at 520–530° over the catalyst at such a speed that the apparent contact period under the reaction conditions is 1 second. The following table shows the results produced with the different catalysts:

|  | Catalyst 1 | Catalyst 2 |
|---|---|---|
| Propylene conversion, percent | 41.5 | 49.5 |
| Yield of— |  |  |
| (a) Acrylontrile, percent | 45.5 | 55.0 |
| (b) Acetonitrile, percent | 6.5 | 11.0 |

(b) If the process described above under 5(a) is carried out under exactly the same conditions, but by using a gas mixture consisting of 75 parts by volume of air, 40 parts by volume of steam, 10 parts by volume of propylene and 10 parts by volume of ammonia there are obtained the following results:

|  | Catalyst 1 | Catalyst 2 |
|---|---|---|
| Propylene conversion, percent | 62.4 | 64.0 |
| Yield of acrylonitrile, based on propylene introduced into the reactor, percent | 34.5 | 39.2 |

(c) A comparison was made with the process described in U.S. Patent No. 2,904,580. The catalyst described in column 4, Example 1 of this U.S. patent specification having a grain size of 150–450 microns was used as catalyst 3.

Furthermore a catalyst 4 was prepared according to the process given in U.S. Patent No. 2,904,580, Example 1 which differs from the aforementioned catalyst 3 only in that the final catalyst consisted of 90% of silica gel and 10% of bismuth phosphomolybdate. Catalysts 3 and 4 were then used in processes corresponding exactly to those indicated in Example 5(b) with the only difference that the catalysts 1 and 2 used therein were substituted by the catalysts 3 and 4. Thereby the following results were obtained:

|  | Catalyst 3 | Catalyst 4 |
|---|---|---|
| Propylene conversion, percent | 51.2 | 33.6 |
| Yield of acrylonitrile, based on propylene introduced into the reactor, percent | 26.8 | 10.2 |

*Example 6*

31 parts of tungstic acid and 30 parts of $$Cu(NO_3)_2 \cdot 3H_2O$$

are dissolved in 400 parts of aqueous ammonia solution with the aid of heat and the resulting solution is applied to 1000 parts of boron phosphate. The boron phosphate thus impregnated is dried for 4 hours at 150° and after being reduced to a grain size of 150–400 microns is annealed for 4 hours at 500°. The thus prepared catalyst contains 96.2% of boron phosphate, 2.4% of copper phosphotungstenate and 1.4% of copper phosphate.

Using a fluid bed furnace at 500°, a gas mixture consisting of 10 parts by volume of isobutylene, 7 parts by volume of ammonia, 75 parts by volume of air and 70 parts by volume of steam is conducted over this catalyst so that the apparent contact period is 1 second. 53% of the isobutylene is reacted and the yield of methacrylonitrile is 73% of the theoretical.

*Example 7*

(a) 700 parts of boric acid and 1400 parts of 85% phosphoric acid are thoroughly mixed together. A solution of 80 parts of $Bi(NO_3)_3 \cdot 5H_2O$ and 60 parts of $Cu(NO_3)_2 \cdot 3H_2O$ in approximately 200 parts of 50% nitric acid is added thereto, the mixture is stirred for another 2 hours, the catalyst mass is dried at 150° and heated for 5 hours at 450°. The thus prepared catalyst contains 90% of boron phosphate, 6.85% of copper phosphate and 3.15% of bismuth phosphate.

0.25 liter of this catalyst having a grain size of 400–750 microns is placed in a vertically disposed fluid bed furnace with a diameter of 50 mm. and a mixture of 0.65 mol of propylene, 6.5 mols of air, 0.52 mol of ammonia, 3.2 mols of nitrogen and 5.0 mols of steam per hour is conducted over the said catalyst. The temperature in the reaction chamber is 510–530°. 78% of the propylene used is reacted and the yield of acrylonitrile is 70%, related to reacted propylene.

(b) If the same process as described in Example 7(a) is carried out with the only difference that instead of the catalyst used in Example 7(a) there is used the catalyst described in Example 1 of U.S. Patent No. 2,904,580 then 61.1% of the propylene is converted and the yield of acrylonitrile, based on converted propylene, is 59.2%.

We claim:

1. In a process for the production of an aliphatic nitrile selected from the group consisting of acrylonitrile and methacrylonitrile by the reaction of an olefin of the group consisting of propylene and isobutylene, respectively, with ammonia and molecular oxygen in the gaseous phase at a temperature between 300 and 700° C. in the presence of a catalyst, the improvement wherein said catalyst consists of 90–99% by weight of granules of an acid reacting solid phosphoric acid catalyst selected from the group consisting of boron phosphate and titanium phosphate having a phosphoric acid content, calculated as $P_2O_5$, of between 30–75% by weight and from 10–1% by weight of at least one activator whose cation is selected from the group consisting of iron, cobalt, copper, bismuth, aluminum, molybdenum and tungsten and whose anion is selected from the group consisting of phosphate, phosphomolybdate and phosphotungstenate.

2. The process of claim 1 wherein the selected acid reacting solid phosphoric acid catalyst is boron phosphate having a phosphoric acid content, calculated as $P_2O_5$, of between 30–75% by weight.

3. The process of claim 1 wherein said activator contains copper as cation.

4. The process of claim 1 wherein said activator contains molybdenum and bismuth cations.

5. The process of claim 1 wherein the selected acid reacting solid phosphoric acid catalyst consists of 95 parts by weight of boron phosphate having a phosphoric acid content, calculated as $P_2O_5$, of between 30–75% by weight and said activator consists of 5 parts by weight of bismuth phosphomolybdate.

6. The process for the production of acrylonitrile which comprises passing a mixture of propylene, ammonia, air, and steam in molecular proportions of 1:0.6:7.5:6, respectively, at a temperature of approximately 520° C. into contact with a fluid bed of the catalyst and activator of claim 5 at such a rate that a contact period of approximately 0.8 second is maintained, and subsequently recovering acrylonitrile in the effluent gas stream.

7. The process of claim 5 wherein the contact period with said catalyst and activator is between 0.1 and 4 seconds.

8. The process of claim 7 wherein said temperature is between 400 and 600° C.

References Cited by the Examiner

UNITED STATES PATENTS

| | | | |
|---|---|---|---|
| 2,904,580 | 9/1959 | Idol | 260—465.3 |
| 3,009,943 | 11/1961 | Hadley et al. | 260—465.3 |

CHARLES B. PARKER, *Primary Examiner.*